April 15, 1941.    J. S. LOCKE    2,238,689
AIR CONDITIONING SYSTEM
Filed March 13, 1937

Inventor
James S. Locke
By George H Fisher
Atty.

Patented Apr. 15, 1941

2,238,689

UNITED STATES PATENT OFFICE 2,238,689

AIR CONDITIONING SYSTEM

James S. Locke, Minneapolis, Minn., assignor to Minneapolis-Honeywell Regulator Company, Minneapolis, Minn., a corporation of Delaware Application March 13, 1937, Serial No. 130,706

15 Claims. (Cl. 257—3)

This invention relates to air conditioning systems in general and more particularly to zone air conditioning systems for a building.

It has been extremely difficult in the past to provide a zone air conditioning system for a building wherein one zone of the building may be demanding cooling while the other zones may be demanding heating. This is especially true where it is desirable to have a single air conditioning unit for all of the zones.

It is therefore an object of this invention to provide an air conditioning system for a building having a plurality of zones wherein one air conditioning unit may be utilized to condition all of the zones and to supply heating to any zone that demands heating and at the same time to supply cooling to any other zone that demands cooling.

In carrying out this feature of this invention the air conditioning unit is divided into a plurality of chambers, one chamber for each zone. Ducts connect each chamber with its respective zone. A fan forces air through the chambers and the ducts to the various zones. Partitions are utilized for dividing each chamber into three passages, a heating passage, a cooling passage, and a by-passage. Heating means are provided in the heating passages and cooling means are provided in the cooling passages. Each chamber is provided with dampers controlled by conditions in their respective zones to control the air flow through the various passages of each chamber. By reason of this arrangement a plurality of zones may be conditioned simultaneously whether the various zones are calling for heating or calling for cooling without both heating and cooling the air delivered to the zone. This arrangement also forms objects of this invention.

Other objects and advantages will become apparent to those skilled in the art upon reference to the accompanying specification, claims and drawing.

For a more thorough understanding of this invention reference is made to the accompanying drawing in which.

Figures 1, 2:
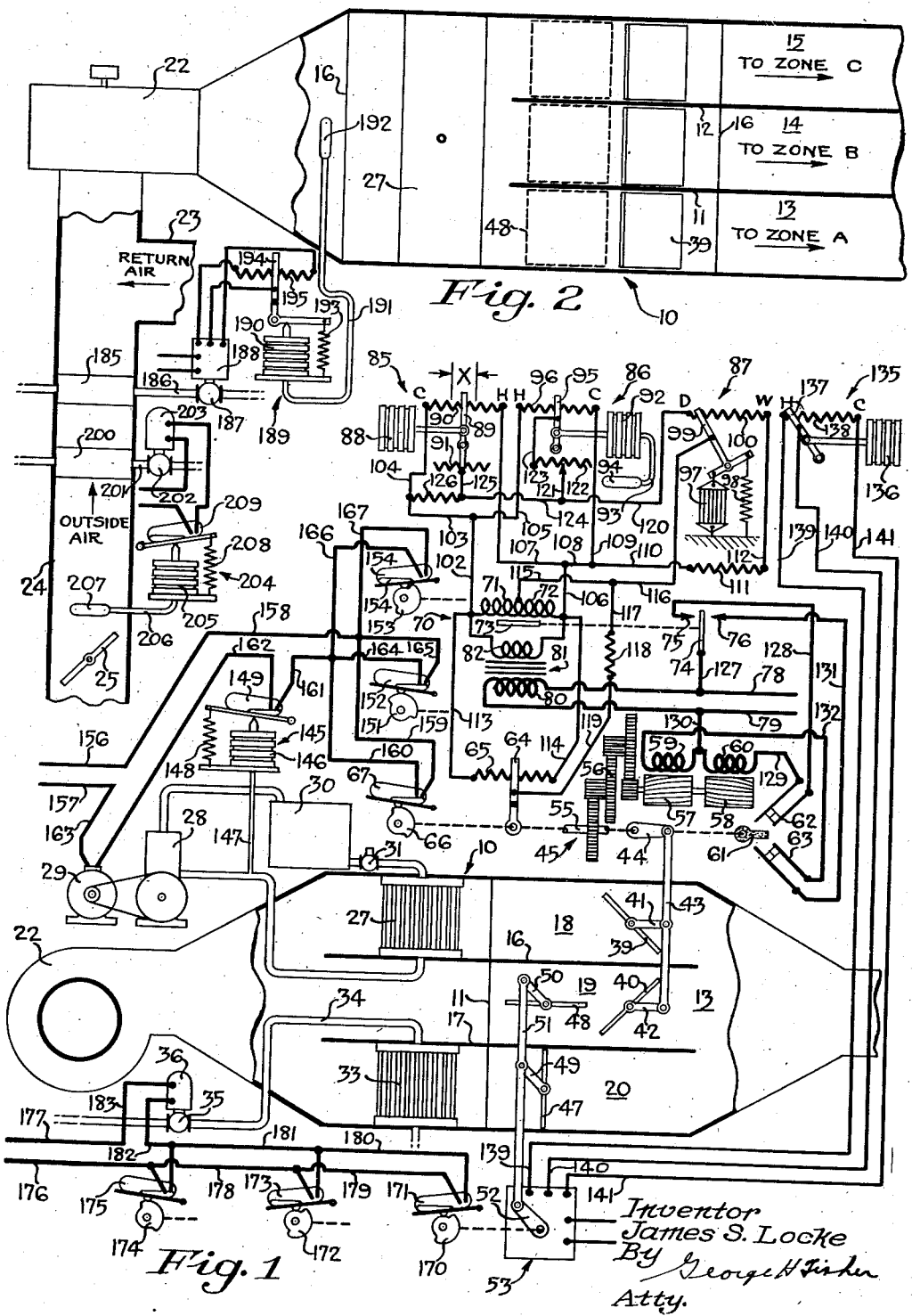
Figure 1 illustrates a vertical sectional view through an air conditioning unit along with a schematic showing of a control system for controlling the operation of the air conditioning unit.
Figure 2 illustrates a horizontal sectional view through the air conditioning unit along with a schematic showing of the manner in which fresh or outside air delivered to the air conditioning unit is tempered in the winter time.

A single air conditioning unit for delivering conditioned air to three zones of a building is generally designated at 10. This air conditioning unit 10 (Figure 2) is divided by two vertical partitions 11 and 12 into three zone passages or chambers 13, 14 and 15. Zone passage 13 delivers conditioned air to a zone A, the zone passage 14 to a zone B and the zone passage 15 to a zone C. Although three zone passages are utilized for purposes of illustration it is to be understood that any number of these passages may be utilized. The air conditioning unit 10 is also divided by two horizontal partitions 16 and 17 (Figure 1) into three horizontal passages 18, 19 and 20. For purposes of illustration the horizontal passage 18 is termed a cooling passage, the horizontal passage 19 is termed a by-pass or tempering passage and the horizontal passage 20 is termed a heating passage. From this it is seen that the air conditioning unit is divided into three vertical zone passages and that each zone passage is divided into three horizontal passages, comprising a heating passage, a by-pass passage and a cooling passage.

A fan 22 receives return air from a return air duct 23 and fresh or outside air from a fresh air duct 24, mixes this air and delivers it to the air conditioning unit 10. The proportions of fresh air and return air utilized may be controlled by a damper 25 located in the fresh air duct. The damper 25 may be controlled manually or automatically in any desired manner. The fan forces the air through the various passages in the air conditioning unit 10 and delivers conditioned air to the various zones of the building.

As will be noted in Figure 1 the horizontal partitions 16 and 17 extend beyond the vertical partitions 11 and 12 so that the cooling, by-pass and heating passages for all three zones are common at this point. Located in the cooling passage 18 at this common point is a cooling coil 27 which is common to all of the zone passages 13, 14 and 15. The cooling coil 27 is shown for purposes of illustration to being a direct expansion cooling coil. Expanding refrigerant is withdrawn from the cooling coil 27 by a compressor 28 driven by an electric motor 29. Compressed refrigerant is delivered by the compressor 28 to a condenser 30. Condensed refrigerant passes from the condenser 30 through an expansion valve 31 into the cooling coil 27. Cooling of the air passing through the cooling passages of the three zone passages 13, 14 and 15 is therefore provided.

In a like manner a heating coil 33 is located in the heating passage 20 and this heating coil is common to all of the zone passages 13, 14 and 15. Heating fluid which may be in the form of steam is supplied to the heating coil 33 through a pipe 34 under the control of a valve 35. The valve 35 is operated by a motor 36, the arrangement being such that when the motor 36 is energized the valve 35 is opened wide and when the motor is deenergized the valve 35 is closed by means of springs, gravity or other means (not shown). In this manner the heating coil 33 is capable of heating air delivered to all of the zones.

Each zone passage is provided with a plurality of dampers and the dampers of the various zone passages are operated independently of each other. In other words the dampers for the zone passage 13 are operated independently of the dampers for the zone passage 14 as are the dampers of the zone passage 15. The zone passage 13 is provided with a damper 39 in the cooling passage 18 and a damper 40 in the by-pass or tempering passage 19. The dampers 39 and 40 are operated through crank arms 41 and 42, a link 43 and a crank arm 44 by a proportioning motor 45. The proportioning motor 45 may be of the type shown and described in application Serial No. 673,236 filed by L. L. Cunningham on May 27, 1933 or may be of the type shown and described in Patent No. 2,028,110 granted to D. G. Taylor on Jan. 14, 1936. The dampers 39 and 40 are so arranged that when the damper 39 is moved towards a closed position the damper 40 is moved correspondingly towards an open position and vice versa. Therefore the flow through the two passages 18 and 19 may be maintained substantially constant while the relative proportions of cooled air and by-passed air may be varied.

The zone passage 13 for zone A is also provided with a damper 47 in the heating passage 20 and a damper 48 in the by-pass passage 19. The dampers 47 and 48 are operated through crank arms 49 and 50, a link 51 and a crank arm 52 by a proportioning motor 53 which may be similar to the proportioning motor 45. The dampers 47 and 48 are also so arranged that when the damper 48 is moved toward a closed position the damper 47 is correspondingly moved toward an open position and vice versa. Therefore the total flow of air through the passages 19 and 20 may be maintained substantially constant while the relative proportions of by-passed air and heated air may be varied.

Each of the zone passages 14 and 15 for zones B and C are provided with dampers in the cooling passage, the by-pass passage and the heating passage identical to those provided in the zone passage 13 for zone A. The dampers in the zone passage 14 for the zone B are controlled by proportioning motors in exactly the same manner as the dampers for zone A and also the dampers for zone C are controlled similarly by proportioning motors. The proportioning motors for zones A, B and C are controlled independently, that is, the proportioning motors and the dampers for zone A are controlled in accordance with conditions existing in zone A of the building, the proportioning motors and dampers for zone B are controlled in accordance with the conditions existing within zone B and similarly the proportioning motors and dampers for zone C are controlled in accordance with the conditions existing within zone C.

The proportioning motor 45 which operates the dampers 39 and 40 for zone A may comprise a shaft 55 for operating the crank arm 44. The shaft 55 is rotated through a reduction gear train 56 by motor rotors 57 and 58. The motor rotors 57 and 58 are in turn controlled by field windings 59 and 60, the arrangement being such that when field winding 60 is energized the damper 39 is moved toward an open position and the damper 40 is moved towards a closed position. When the field winding 59 is energized the damper 39 is moved toward a closed position and the damper 40 is moved towards an open position. The shaft 55 also operates an abutment member 61 which is adapted to open limit switches 62 and 63 when the damper 39 is moved to a full open position or a full closed position respectively. The shaft 55 also operates a slider 64 with respect to a resistance element 65. The slider 64 and the resistance element 65 form a balancing potentiometer. When the damper 39 is moved toward an open position the slider 64 is moved toward the left and when the damper 39 is moved toward a closed position the slider 64 is moved toward the right. The shaft 55 also operates a cam 66 which in turn operates a mercury switch 67. The arrangement is such that when the damper 39 is in a closed position the switch 67 is open but when the damper 39 moves out of the closed position towards an open position the switch 67 is closed.

The direction of operation of the proportioning motor 45 is controlled by a relay generally designated at 70. The relay 70 may comprise series connected relay coils 71 and 72 for influencing an armature 73. The armature 73 operates a switch arm 74 with respect to contacts 75 and 76. Line wires 78 and 79 leading from a source of power (not shown) are connected to a primary 80 of a step-down transformer 81. The secondary 82 of the transformer 81 is connected to the left and right ends respectively of the relay coils 71 and 72. Therefore the relay coils 71 and 72 are connected across a source of power. When the relay coil 71 is energized more than the relay coil 72 the switch arm 74 is moved into engagement with the contact 75 and when the relay coil 72 is energized more than the relay coil 71 the switch arm 74 is moved into engagement with the contact 76. When the relay coils 71 and 72 are equally energized the switch arm 74 is maintained spaced midway between the contacts 75 and 76 as shown in Figure 1.

The relay 70 is controlled by a temperature responsive controller 85 located in zone A so as to respond to temperature conditions within zone A. The relay 70 is also controlled by a temperature responsive compensator 86 responsive to variations in outdoor temperature. Further the relay 70 is controlled by a humidity responsive controller 87 located in zone A so as to respond to relative humidity conditions existing within zone A.

The zone temperature responsive controller 85 may comprise a bellows 88 containing a volatile fluid for operating a slider 89 with respect to a resistance element 90 and a center tap resistance element 91. The slider 89 and the resistance element 90 form a control potentiometer while the slider 89 and the resistance element 91 form an equalizing resistance. Upon an increase in temperature in the zone A, the slider 89 is moved to the right with respect to the resistance element 90 in the direction indicated by the character H and upon a decrease in zone temperature the slider 89 is moved to the left in the direction indicated by the character C. The outdoor temperature responsive compensator 86 may comprise a bellows 92 connected by a capillary tube 93 to a bulb 94. The bulb 94 contains a volatile fluid and may be located in the outside or fresh air duct 24 so as to be affected by variations in outdoor temperature. The bellows 92 operates a slider 95 with respect to a resistance element 96. The slider 95 and the resistance element 96 form a compensating potentiometer. Upon an increase in outdoor temperature the slider 95 is moved to the left in the direction indicated by the character H and upon a decrease in outdoor temperature the slider 95 is moved to the right in the direction indicated by the character C. The zone relative humidity responsive controller 87 may comprise a humidity responsive element 97 acting against the action of a spring 98 for moving a slider 99 with respect to a resistance element 87. Upon an increase in zone relative humidity the slider 99 is moved towards the right in the direction indicated by the character W and upon a decrease in relative humidity the slider 99 is moved towards the left in the direction indicated by the character D. The slider 99 is normally in the left hand position as shown in Figure 1, but as the relative humidity in the zone A becomes excessive the slider 99 is moved towards the right.

The left end of the relay coil 71 is connected by wires 102, 103, 104 and 105 to the left ends of the resistance elements 90 and 96. The right end of the relay coil 72 is connected by wires 106, 107, 108 and 109 to the right ends of the resistance elements 90 and 96. The right end of the relay coil 72 is also connected by wires 106, 108 and 110, a protective resistance 111 and wire 112 to the right end of the resistance element 100. The left and right ends respectively of the relay coils 71 and 72 are also connected by wires 113 and 114 to the left and right ends respectively of the resistance element 65 of the balancing potentiometer. The junction of the relay coils 71 and 72 are connected by wires 115, 116 and 117, a resistance element 118 and a wire 119 to the slider 99 of the humidity responsive controller and the slider 64 of the balancing potentiometer. The left end of the resistance element 100 of the humidity responsive controller 87 is connected by wires 120 and 121, a variable resistance 122 and a wire 123 to the slider 95 of the compensating potentiometer. The junction of wires 120 and 121 is connected by wires 124 and 125 to the center tap of the resistance element 91. The junction of wires 124 and 125 is connected by a resistance 126 to the junction of wires 103 and 104.

With the slider 99 of the humidity responsive controller 87 in the position shown in Figure 1 it is seen that the junction of the relay coils 71 and 72 is connected to the slider 64 of the balancing potentiometer, the slider 95 of the outdoor compensator and the slider 89 of the zone temperature responsive controller. Therefore, the control potentiometer of the zone temperature responsive controller 85, the compensating potentiometer of the outdoor temperature responsive controller 86 and the balancing potentiometer operated by the motor are connected in parallel with relay coils 71 and 72 and across the secondary 82. The resistance 100 of the humidity responsive controller and the protective resistance 111 which are connected in series with respect to each other are connected in parallel with the relay coil 72 and the resistance 126 is connected in parallel with the relay coil 71. The resistance 126 is so selected that the resistance value thereof is equal to the sum of the resistance values of the protective resistance 111 and the resistance 100 of the humidity responsive controller 87. Therefore, when the slider 99 of the humidity responsive controller 87 is in the extreme left position, as shown, the resistances 100, 111 and 126 have no unbalancing effect upon the operation of the relay coils 71 and 72.

Assume the parts in the position shown in Figure 1 with the slider 99 of the humidity responsive controller 87 in the extreme left position and omit for the time being the operation of the outdoor temperature responsive compensator 86. An increase in zone temperature causes right hand movement of the slider 89 of the temperature responsive controller 85 to partially short circuit the relay coil 72 to decrease the energization thereof and increase the energization of the relay coil 71. The switch arm 74 thereupon moves into engagement with the contact 75 to complete a circuit from the line wire 78 through wire 127, switch arm 74, contact 75, wire 128, limit switch 62, wire 129, field winding 50 and wire 130 back to the other line wire 79. Completion of this circuit energizes the field winding 60 to operate the proportioning motor 45 in a direction to move the damper 39 towards an open position and the damper 40 towards a closed position. This increases the amount of cooled air and decreases the amount of by-passed air delivered to the space. Operation of the proportioning motor 45 in this direction causes left hand movement of the slider 64 to decrease the energization of the relay coil 71 and increase the energization of the relay coil 72. When the slider 64 has moved sufficiently far to the left to rebalance the energization of the relay coils 71 and 72 the switch arm 74 is moved out of engagement with the contact 75 to break the circuit through the field winding 60 whereupon further operation of the motor 45 is interrupted. In this manner the damper 39 is modulated toward an open position and the damper 40 is modulated toward a closed position in direct accordance with the amount of increase in zone temperature.

Upon a decrease in zone temperature the slider 89 of the zone temperature responsive controller moves to the left to decrease the energization of the relay coil 71 and decrease the energization of the relay coil 72. As a result the switch arm 74 engages the contact 76 to complete a circuit from the line wire 78 through wire 127, switch arm 74, contact 76, wire 131, limit switch 63, wire 132, field winding 59 and wire 130 back to the other line wire 77. Completion of this circuit energizes the field winding 59 to operate the proportioning motor 45 in a direction which moves the damper 39 towards a closed position and moves the damper 40 towards an open position. This decreases the amount of cooled air and increases the amount of by-passed air delivered to the zone. Operation of the proportioning motor 45 in this direction causes right hand movement of the slider 64 of the balancing potentiometer to decrease the energizaztion of the relay coil 72 and increase the energization of the relay coil 71. When the slider 64 has moved sufficiently far to the right to rebalance the energization of the relay coils 71 and 72 the switch arm 74 is moved out of engagement with the contact 76 to interrupt further operation of the proportioning motor 45. In this manner the damper 39 is modulated toward a closed position and the damper 40 is modulated toward an open position in direct accordance with the amount of decrease in space temperature.

The resistance 118 in series with the slider 64 of the balancing potentiometer performs two functions, that of a protective resistance and that of desensitizing the rebalancing action of the balancing potentiometer. By reason of this, the slider 89 of the control potentiometer need only move through the control range X to cause complete operation of the proportioning motor from one extreme position to the other. Therefore the temperature within the zone A is maintained within narrow temperature limits indicated by range X. The potentiometer of the outdoor compensator 86 is connected in parallel with the control potentiometer and the relay coil 71 and 72. Upon an increase in outdoor temperature the slider 95 moves to the left to decrease the energization of the relay coil 71 and increase the energization of the relay coil 72 which tends to close the damper 39 and open the damper 40 to decrease the temperature of the air delivered to the zone. In a like manner a decrease in outdoor temperature tends to decrease the temperature of the air delivered to the zone. The variable resistance 122 in series with the slider 95 acts to desensitize the controlling action of the compensating potentiometer so that the main control is provided by the zone temperature responsive controller 85. The outdoor temperature responsive compensator 86 therefore acts to shift the control range X of the zone temperature responsive controller 85. As the outdoor temperature rises the control range X is moved toward the right so that higher temperatures are maintained within zone A. Likewise upon a decrease in outdoor temperature the outdoor temperature responsive compensator operates to shift the control range X to the left so that lower temperatures are maintained within zone A. In other words the two controllers 85 and 86 operate to maintain a desired temperature within zone A which temperature is adjusted in accordance with outdoor temperatures.

If the relative humidity in zone A becomes excessive, the slider 99 of the relative humidity responsive controller 87 moves toward the right. Right hand movement of the slider 99 decreases the resistance in parallel with the relay coil 72 and increases the resistance in parallel with the relay coil 71 to increase the energization of the relay coil 71 and decrease the energization of the relay coil 72. This causes movement of the damper 39 towards an open position and movement of the damper 40 towards a closed position to decrease the temperature of the air delivered to the zone. Also movement of the slider 99 of the humidity responsive controller 87 toward the right places resistance in series with the sliders 89 and 95 of the two temperature responsive controllers 85 and 86. This desensitizes the controlling action of the two temperature responsive controllers 85 and 86 and gradually renders these temperature responsive controllers ineffective to control the operation of the proportioning motor 45. This desensitizing action increases as the relative humidity becomes more and more excessive. Until such time as the slider 99 of the relative humidity responsive controller reaches the extreme right hand position. When the slider 99 reaches this position the damper 39 is opened wide and the damper 40 is closed so that substantially all cold air is delivered to the zone. The temperature control of the dampers 39 and 40 is at this time rendered ineffective.

By reason of the above construction the dampers 39 and 40 are operated to maintain desired temperatures within zone A which temperatures are adjusted in accordance with outdoor temperatures as long as the zone relative humidity remains below a given value. As the zone relative humidity becomes excessive the control of the dampers 39 and 40 is gradually taken away from the temperature responsive controllers 85 and 86 and the dampers are moved to positions to increase the supply of cold air delivered to the space for dehumidification purposes until the zone relative humidity becomes normal and the control of the dampers 39 and 40 is returned to the temperature responsive controllers 85 and 86 to maintain the desired temperatures within the space.

The proportioning motor 53 which controls the operation of the dampers 47 and 48 for zone A is controlled by a zone temperature responsive controller generally designated at 135. This zone temperature responsive controller 135 may comprise a bellows 136 containing a volatile fluid for operating a slider 137 with respect to a resistance element 138. The slider 137 and the resistance element 138 are connected by wires 139, 140 and 141 to the proportioning motor 153 to position the motor in accordance with variations in zone temperature. Upon an increase in zone temperature the slider 137 moves to the left in the direction indicated by the character H to move the damper 47 toward a closed position and move the damper 48 toward an open position in accordance with the amount of increase in space temperature. Upon a decrease in space temperature the slider 137 is moved toward the right to move the damper 48 towards a closed position and the damper 47 towards an open position in accordance with the amount of decrease in space temperature. Movement of the damper 48 towards a closed position and the damper 47 towards an open position increases the temperature of the air delivered to the zone and vice versa movement of the damper 48 towards an open position and movement of the damper 47 towards a closed position decreases the temperature of the air delivered to zone A.

The temperature settings of the zone temperatures responsive controllers 85 and 135 are such that over-lapping operation of the dampers controlled thereby is prevented. For purposes of illustration it is assumed that the temperature limits of the zone temperature responsive controller 135 are 70 to 72°, and that the zone temperature limits for the zone temperature responsive controller 85 are 75 to 85°. With these temperature limits it is now assumed that the zone temperature is 70°. The slider 89 of the zone temperature responsive controller 85 will be at the left end of the control range X so that the damper 39 is closed and the damper 40 is wide open. Therefore no cold air can be delivered to zone A. Slider 137 of the zone temperature responsive controller is at the extreme right hand position and therefore the damper 47 is wide open and the damper 48 is closed. Under these conditions only heated air is delivered to zone A. As the temperature of zone A increases the damper 47 moves towards a closed position and the damper 48 moves towards an open position to decrease the amount of heated air and increase the amount of by-passed air delivered to zone A. When the zone temperature rises to 72° the slider 137 will assume the left hand position as shown in Figure 1 and the damper 48 will be wide open and the damper 47 will be closed whereupon all by-passed air is delivered to zone A. By-passed air will be continued to be delivered to zone A until the zone temperature increases to a value which causes movement of the slider 89 of the zone temperature responsive controller 85 away from the left end of the control range X. As the slider 89 moves towards the right through the control range X the damper 40 is moved toward a closed position and the damper 39 is moved toward an open position to increase the amount of cold air delivered to the zone and decrease the amount of by-passed air delivered to the zone. This operation will occur until such time as the slider 89 reaches the right end of the control range X whereupon the damper 40 will be completely closed and the damper 39 will be completely open to supply all cold air to the zone A.

Since the lower temperature limit of the zone temperature responsive controller 85 is 75° and since the upper temperature limit of the zone temperature responsive controller 135 is 72°, normally cold air and heated air cannot be delivered to the zone A at the same time. If, however, the relative humidity of the zone A becomes excessive so as to cause opening of the damper 39 and closing of the damper 40 to deliver cold air to the zone for dehumidification purposes and the zone temperature should decrease below 72° the damper 47 will be moved toward an open position to supply heated air to the zone for reheating purposes.

The temperature and humidity control of zones B and C are exactly the same as that of zone A and therefore a further description is not considered necessary. However, it is pointed out that zones A, B and C are independently controlled so that it is possible to be cooling zone A and be heating zone B at the same time. This mode of operation, that is cooling in one zone and heating in another zone from a single air conditioning unit is not readily or economically accomplished by the structures of the prior art and therefore this forms a salient feature of this invention.

If desired, heating fluid may be at all times supplied to the heating coil 33 and refrigerant may at all times be supplied to the cooling coil 27 and satisfactory operation would be provided. However, for economical reasons it is better to stop the supply of heating fluid to the heating coil 33 if all of the dampers in the heating passages are closed indicating that there is no demand for heating. Also, it is better to stop the supply of refrigerant to the cooling coil 27 if all of the dampers 39 in the cooling passage are closed. Therefore when there is no demand for heating or cooling the heating means and the cooling means may be rendered inoperative.

The compressor motor 29 may be controlled by a suction pressure controller 145 having a bellows 146 connected by a pipe 147 to the suction line of the refrigerating apparatus. The bellows 146 operates against a spring 148 to close a mercury switch 149 when the suction pressure increases to a predetermined value. A cam 151 operated by the proportioning motor which controls the damper in the cooling passage of zone B operates a switch 152, the arrangement being such that when the damper is moved away from closed position the switch 152 is closed. Likewise a cam 153 operated by the proportioning motor which controls the damper in the cooling passage of zone C operates a mercury switch 154 in such a manner to close the mercury switch when the damper is moved away from a closed position. Power is supplied to the compressor motor 29 by line wires 156 and 157 leading from some source of power not shown. Assume now that the suction pressure increases to close the switch 149 and that the damper 39 of zone A is moved away from the closed position, the mercury switch 67 controlled by the proportioning motor 45 is closed to complete a circuit from the line wire 156 through wires 158 and 159, mercury switch 67, wires 160 and 161, mercury switch 149, wire 162, electric motor 29 and wire 163 back to the other line wire 157. Completion of this circuit causes operation of the compressor motor 29 and when the suction pressure decreases below a predetermined value the switch 149 opens to stop operation of the compressor. The switches 149 and 67 are connected in series so that both switches must close in order to start the compressor motor 29. The switches 152 and 154 are connected in parallel with the switch 67 by wires 164, 165, 166 and 167. These three switches 67, 152 and 154, although they are located in parallel with each other, are located in series with the switch 149, therefore when any of the dampers in the cooling passages open the compressor motor 29 is placed under control of the suction pressure controller 145 to supply refrigerant to the cooling coil 27. If none of the dampers in the cooling passages are opened it is impossible to operate the refrigerating apparatus.

The proportioning motor 53 which operates the dampers 47 and 48 of zone A also operates a cam 170 which in turn operates a mercury switch 171. Similarly the proportioning motor for zone B operates a cam 172 for opening and closing a mercury switch 173. The cam 174 which opens and closes the switch 175 is operated by the proportioning motor which controls the dampers of zone C. These switches 171, 173 and 175 are so arranged that they are closed whenever their respective dampers in the heating passage are moved away from a closed position. Power is supplied to the motor 36 which controls the supply of heating fluid to the heating coil 33 by line wires 176 and 177 leading from some source of power (not shown). Assume now that the damper 47 is moved by the proportioning motor 53 away from the closed position, the switch 171 is closed to complete a circuit from the line wire 176 through wires 178 and 179, mercury switch 171, wires 180, 181 and 182, motor 36 and wire 183 back to the other line wire 171. The motor 36 is energized and the valve 35 is opened to supply heating fluid to the heating coil 33. The switches 173 and 175 are connected in parallel with the switch 171 so that if any of these switches are closed, heating fluid is supplied to the heating coil 33. If the dampers in the heating passages of the three zones are all closed, indicating that there is no demand for heating the valve 35 will be closed to prevent the supply of heating fluid to the heating coil 33.

During the winter time the outside or fresh air delivered to the air conditioning unit may be tempered by a heating coil 185. Heating fluid is supplied to the heating coil 185 through a pipe 186 under the control of a valve 187. The valve 187 may be operated by a proportioning motor 188 in all respects similar to the proportioning motor 45. Proportioning motor 188 is controlled by a temperature responsive controller 189 comprising a bellows 190 connected by a capillary tube 191 to a bulb 192 located in the air conditioning unit on the discharge side of the fan 22. The bellows 190 operates against the action of a spring 193 to move a slider 194 with respect to a resistance element 195. The slider 194 and the resistance element 195 form a control potentiometer for the proportioning motor 188. Proportioning motor 188 is positioned by the temperature responsive controller 189 to modulate the supply of heating fluid to the heating coil 185 to maintain a substantially constant temperature on the discharge side of the fan 22. This then in the winter fixes the temperature of the air which is by-passed around the heating coil 33 at a substantially constant value. Another heating coil 200 located in the outside air duct 24 is utilized for preventing freezing of the heating coil 185. Heating fluid is supplied to the heating coil 200 through a pipe 201 under the control of a valve 202. The valve 202 is supplied by a motor 203 which when energized opens the valve 202. The motor 203 is controlled by a temperature responsive controller 204 comprising a bellows 205 connected by a capillary tube 206 to a bulb 207 located in the outside air duct 24. The bellows 205 operates against a spring 208 to open and close a mercury switch 209. The temperature responsive controller 204 is so arranged that when the outdoor temperature falls below 32° the switch 209 is closed to energize the motor 203 which opens the valve 202 to supply heating fluid to the heating coil 200. This therefore as pointed out above provides protection against freezing of the heating coil 185.

Although for purposes of illustration I have shown one form of my invention, other forms thereof may become apparent to those skilled in the art upon reference to this specification and therefore this invention is to be limited only by the scope of the appended claims and prior art.

I claim as my invention:

1. In an air conditioning system, the combination of an air conditioning chamber divided into three parallel passages for conditioning air for a space, means for circulating air through the three passages and to the space to be conditioned, heating means in one of said passages, cooling means in another of said passages, the remaining passage forming a by-pass passage, damper means controlling the flow of air through the by-pass passage and the passage containing the heating means, the arrangement being such that as the flow of air through the passage containing the heating means is increased the flow of air through the by-pass passage is decreased, damper means controlling the flow of air through the by-pass passage and the passage containing the cooling means, the arrangement being such that as the flow of air through the passage containing the cooling means is increased the flow of air through the by-pass passage is decreased and means for maintaining the space temperature at desired values comprising means for controlling both damper means in accordance with space temperature to properly proportion the flow of air through the passages.

2. In an air conditioning system for a building having a plurality of zones to be conditioned, the combination of an air conditioning chamber including a sub-chamber for each zone, ducts connecting each sub-chamber with its respective zone, means for forcing air through the sub-chambers and the ducts to the various zones, partitions dividing each sub-chamber into three passages, a heating passage, a cooling passage and a by-pass passage, heating means for the heating passages, cooling means for the cooling passages, and damper means for each sub-chamber for controlling the flow of air through the three passages of that sub-chamber.

3. In an air conditioning system for a building having a plurality of zones to be conditioned, the combination of an air conditioning chamber including a sub-chamber for each zone, ducts connecting each sub-chamber with its respective zone, means for forcing air through the sub-chamber and the ducts to the various zones, partitions dividing each sub-chamber into three passages, a heating passage, a cooling passage and a by-pass passage, heating means for the heating passages, cooling means for the cooling passages, damper means for each sub-chamber for controlling the flow of air through the three passages of that sub-chamber and means responsive to the temperature of each zone for controlling the damper means associated with that zone whereby desired temperatures are maintained in the various zones.

4. In an air conditioning system for a building having a plurality of zones to be conditioned, the combination of an air conditioning chamber including a sub-chamber for each zone, ducts connecting each sub-chamber with its respective zone, means for forcing air through the sub-chambers and the ducts to the various zones, partitions dividing each sub-chamber into three passages, a heating passage, a cooling passage and a by-pass passage, heating means for the heating passages, cooling means for the cooling passages, and damper means for each sub-chamber for controlling the flow of air through the three passages of that sub-chamber, said damper means including dampers for controlling the relative flow of air through the by-pass passage and the heating passage and dampers for controlling the relative flow of air through the by-pass passage and the cooling passage.

5. In an air conditioning system for a building having a plurality of zones to be conditioned, the combination of an air conditioning chamber including a subchamber for each zone, ducts connecting each sub-chamber with its respective zone, means for forcing air through the sub-chambers and the ducts to the various zones, partitions dividing each sub-chamber into three passages, a heating passage, a cooling passage and a by-pass passage, heating means for the heating passages, cooling means for the cooling passages, damper means for each sub-chamber for controlling the flow of air through the three passages of that sub-chamber, said damper means including dampers for controlling the relative flow of air through the by-pass passage and the heating passage and dampers for controlling the relative flow of air through the by-pass passage and the cooling passage and means responsive to the temperature of each zone for controlling the damper means associated with that zone whereby desired temperatures are maintained in the various zones.

6. In an air conditioning system for a building having a plurality of zones to be conditioned, the combination of an air conditioning chamber including a sub-chamber for each zone, ducts connecting each sub-chamber with its respective zone, means for forcing air through the sub-chambers and the ducts to the various zones, partitions dividing each sub-chamber into three passages, a heating passage, a cooling passage and a by-pass passage, heating means for the heating passages, cooling means for the cooling passages, damper means for each sub-chamber for controlling the flow of air through the three passages of that sub-chamber, said damper means including dampers for controlling the relative flow of air through the by-pass passage and the heating passage and dampers for controlling the relative flow of air through the by-pass passage and the cooling passage, means for placing the heating means in operation when any of the dampers are positioned to permit a flow of air through any of the heating passages, and means for placing the cooling means in operation when any of the dampers are positioned to permit a flow of air through any of the cooling passages.

7. In an air conditioning system for a building having a plurality of zones to be conditioned, the combination of an air conditioning chamber including a sub-chamber for each zone, ducts connecting each sub-chamber with its respective zone, means for forcing air through the sub-chambers and the ducts to the various zones, partitions dividing each sub-chamber into three passages, a heating passage, a cooling passage and a by-pass passage, heating means for the heating passages, cooling means for the cooling passages, damper means for each sub-chamber for controlling the flow of air through the three passages of that sub-chamber, said damper means including dampers for controlling the relative flow of air through the by-pass passage and the heating passage and dampers for controlling the relative flow of air through the by-pass passage and the cooling passage, means for placing the heating means in operation when any of the dampers are positioned to permit a flow of air through any of the heating passages, means for placing the cooling means in operation when any of the dampers are positioned to permit a flow of air through any of the cooling passages and means responsive to the temperature of each zone for controlling the damper means associated with that zone whereby desired temperatures are maintained in the various zones.

8. In an air conditioning system for a building having a plurality of zones to be conditioned, the combination of an air conditioning chamber including a sub-chamber for each zone, ducts connecting each sub-chamber with its respective zone, means for forcing air through the sub-chambers and the ducts to the various zones, partitions dividing each sub-chamber into three passages, a heating passage, a cooling passage and a by-pass passage, heating means for the heating passages, cooling means for the cooling passages, damper means for each sub-chamber for controlling the flow of air through the three passages of that sub-chamber, said damper means including dampers for controlling the relative flow of air through the by-pass passage and the heating passage and dampers for controlling the relative flow of air through the by-pass passage and the cooling passage and means responsive to the temperature of each zone for controlling the damper means associated with that zone to pass substantially all of the air through the cooling passage when the temperature of that zone is high, to decrease the flow of air through the cooling passage and to increase the flow of air through the by-pass passage as the temperature of the zone decreases until the zone temperature reaches an intermediate value whereupon substantially all of the air is passed through the by-pass passage, and to decrease the flow of air through the by-pass passage and increase the flow of air through the heating passage as the zone temperature decreases further until the zone temperature reaches a low value whereupon substantially all of the air is passed through the heating passage.

9. In an air conditioning system for a building having a plurality of zones to be conditioned, the combination of an air conditioning chamber including a sub-chamber for each zone, ducts connecting each sub-chamber with its respective zone, means for forcing air through the sub-chambers and the ducts to the various zones, partitions dividing each sub-chamber into three passages, a heating passage, a cooling passage and a by-pass passage, heating means for the heating passages, cooling means for the cooling passages, damper means for each sub-chamber for controlling the flow of air through the three passages of that sub-chamber, said damper means including dampers for controlling the relative flow of air through the by-pass passage and the heating passage and dampers for controlling the relative flow of air through the by-pass passage and the cooling passage and means responsive to the temperature of each zone for controlling the damper means associated with that zone to pass substantially all of the air through the cooling passage when the temperature of that zone is high, to decrease the flow of air through the cooling passage and to increase the flow of air through the by-pass passage as the temperature of the zone decreases until the zone temperature reaches an intermediate value whereupon substantially all of the air is passed through the by-pass passage, to decrease the flow of air through the by-pass passage and increase the flow of air through the heating passage as the zone temperature decreases further until the zone temperature reaches a low value whereupon substantially all of the air is passed through the heating passage, means for placing the heating means in operation when any of the dampers are positioned to permit a flow of air through any of the heating passages, and means for placing the cooling means in operation when any of the dampers are positioned to permit a flow of air through any of the cooling passages.

10. In an air conditioning system for a building having a plurality of zones to be conditioned, the combination of an air conditioning chamber including a sub-chamber for each zone, ducts connecting each sub-chamber with its respective zone, means for causing a circulation of air through the sub-chambers and the ducts to the various zones, means dividing each sub-chamber into a conditioning passage and a by-pass passage, means for conditioning the air passing through the conditioning passages, damper means for each sub-chamber for proportioning the flow of air through the passages, means responsive to the condition being maintained in each of the zones for controlling the dampers for the respective zones, and means responsive to operation of any of said dampers to permit flow of air past the conditioning means to cause operation of the conditioning means.

11. In an air conditioning system for air conditioning a space, the combination of, an air conditioning chamber divided into three parallel passages, means for circulating air through the three passages and to the space to be conditioned, heating means in one of the passages for heating the space, cooling means in another of the passages for cooling the space, the remaining passage forming a by-pass passage, damper means for controlling the flow of air through the respective passages, means for placing the heating means in operation when the damper means are positioned to cause a flow of air through the passage containing the heating means, means for placing the cooling means in operation when the damper means are positioned to cause a flow of air through the passage containing the cooling means, and means for maintaining the space temperature at desired values comprising means responsive to the temperature of the space for controlling the damper means to proportion properly the flow of air through the passages.

12. In an air conditioning system for air conditioning a space, the combination of, an air conditioning chamber divided into three parallel passages, means for circulating air through the three passages and to the space to be conditioned, heating means in one of the passages for heating the space, cooling means in another of the passages for cooling and dehumidifying the space, the remaining passage forming a by-pass passage, damper means for controlling the flow of air through the respective passages, means for placing the heating means in operation when the damper means are positioned to cause a flow of air through the passage containing the heating means, means for placing the cooling means in operation when the damper means are positioned to cause a flow of air through the passage containing the cooling means, and means for maintaining the dry bulb and relative humidity conditions of the space at desired values comprising means responsive to the space dry bulb temperature and relative humidity for controlling the damper means to proportion properly the flow of air through the passages.

13. In an air conditioning system, the combination of an air conditioning chamber divided into three parallel passages for conditioning air for a space, means for circulating air through the three passages and to the space to be conditioned, heating means in one of said passages, cooling means in another of said passages, the remaining passage forming a by-pass passage, first damper means controlling the flow of air through the by-pass passage and the passage containing the heating means, the arrangement being such that as the flow of air through the passage containing the heating means is increased the flow of air through the by-pass passage is decreased, second damper means controlling the flow of air through the by-pass passage and the passage containing the cooling means, the arrangement being such that as the flow of air through the passage containing the cooling means is increased the flow of air through the by-pass passage is decreased, means for placing the heating means in operation when the first damper means are positioned to cause a flow of air through the passage containing the heating means, means for placing the cooling means in operation when the second damper means are positioned to cause a flow of air through the passage containing the cooling means, and means for maintaining the space temperature at desired values comprising means for controlling both damper means in accordance with space temperature to proportion properly the flow of air through the passages.

14. In an air conditioning system, the combination of an air conditioning chamber divided into three parallel passages for conditioning air for a space, means for circulating air through the three passages and to the space to be conditioned, heating means in one of said passages, cooling and dehumidifying means in another of said passages, the remaining passage forming a by-pass passage, first damper means controlling the flow of air through the by-pass passage and the passage containing the heating means, the arrangement being such that as the flow of air through the passage containing the heating means is increased the flow of air through the by-pass passage is decreased, second damper means controlling the flow of air through the by-pass passage and the passage containing the cooling means, the arrangement being such that as the flow of air through the passage containing the cooling means is increased the flow of air through the by-pass passage is decreased, and means for maintaining the dry bulb and relative humidity conditions of the space at desired values comprising means responsive to the space dry bulb temperature and relative humidity for controlling both damper means to proportion properly the flow of air through the passages.

15. In an air conditioning system, the combination of an air conditioning chamber divided into three parallel passages for conditioning air for a space, means for circulating air through the three passages and to the space to be conditioned, heating means in one of said passages, cooling and dehumidifying means in another of said passages, the remaining passage forming a by-pass passage, first damper means controlling the flow of air through the by-pass passage and the passage containing the heating means, the arrangement being such that as the flow of air through the passage containing the heating means is increased the flow of air through the by-pass passage is decreased, second damper means controlling the flow of air through the by-pass passage and the passage containing the cooling means, the arrangement being such that as the flow of air through the passage containing the cooling means is increased the flow of air through the by-pass passage is decreased, means for placing the heating means in operation when the first damper means are positioned to cause a flow of air through the passage containing the heating means, means for placing the cooling and dehumidifying means in operation when the second damper means are positioned to cause a flow of air through the passage containing the cooling and dehumidifying means, and means for maintaining the dry bulb and relative humidity conditions of the space at desired values comprising means responsive to the space dry bulb temperature and relative humidity for controlling both damper means to proportion properly the flow of air through the passages.

JAMES S. LOCKE.